(12) United States Patent
Carr et al.

(10) Patent No.: US 12,110,688 B2
(45) Date of Patent: Oct. 8, 2024

(54) FLAME-RESISTANT COMPOSITES FOR ROOFING UNDERLAYMENT

(71) Applicant: Holcim Technology Ltd, Zug (CH)

(72) Inventors: Joseph R. Carr, Indianapolis, IN (US); Matthew J. Reynolds, Goodlettsville, TN (US)

(73) Assignee: Holcim Technology Ltd, Zug (CH)

( * ) Notice: Subject to any disclaimer, the term of this patent is extended or adjusted under 35 U.S.C. 154(b) by 341 days.

(21) Appl. No.: 17/624,378

(22) PCT Filed: Jul. 2, 2020

(86) PCT No.: PCT/US2020/040590
§ 371 (c)(1),
(2) Date: Jan. 3, 2022

(87) PCT Pub. No.: WO2021/003327
PCT Pub. Date: Jan. 7, 2021

(65) Prior Publication Data
US 2022/0364367 A1 Nov. 17, 2022

Related U.S. Application Data

(60) Provisional application No. 62/870,118, filed on Jul. 3, 2019, provisional application No. 62/872,808, filed
(Continued)

(51) Int. Cl.
*E04D 11/02* (2006.01)
*B32B 5/02* (2006.01)
(Continued)

(52) U.S. Cl.
CPC .............. *E04D 11/02* (2013.01); *B32B 5/022* (2013.01); *B32B 7/06* (2013.01); *B32B 7/12* (2013.01);
(Continued)

(58) Field of Classification Search
CPC ........... E04D 11/02; B32B 5/022; B32B 7/06; B32B 7/12; B32B 11/046; B32B 11/10; B32B 27/32; B32B 2307/3065; B32B 2419/06; B32B 15/085; B32B 27/08; B32B 2250/05; B32B 2255/20; B32B 2260/021;
(Continued)

(56) References Cited

U.S. PATENT DOCUMENTS 9,441,140 B2 * 9/2016 Zhou ...................... E04D 5/10
10,011,092 B2 * 7/2018 Zhou ...................... B32B 11/10
(Continued)

FOREIGN PATENT DOCUMENTS

WO 2009-006168 A1 1/2009

OTHER PUBLICATIONS

International Search Report and Written Opinion for corresponding PCT/US2020/040590 dated Oct. 22, 2020 (12 pps).

*Primary Examiner* — Patricia L. Nordmeyer
(74) *Attorney, Agent, or Firm* — Renner, Kenner; Arthur M. Reginelli

(57) ABSTRACT

A composite comprising (i) a pressure-sensitive adhesive component including first and second planar surfaces; (ii) a fire-resistant fabric adhered to the first planar surface; and (iii) a cap layer disposed on said fire-resistant fabric opposite said asphaltic component.

15 Claims, 4 Drawing Sheets

Related U.S. Application Data on Jul. 11, 2019, provisional application No. 62/952,853, filed on Dec. 23, 2019.

(51) Int. Cl.
| | |
|---|---|
| *B32B 7/06* | (2019.01) |
| *B32B 7/12* | (2006.01) |
| *B32B 11/04* | (2006.01) |
| *B32B 11/10* | (2006.01) |
| *B32B 27/32* | (2006.01) |

(52) U.S. Cl.
CPC ............ *B32B 11/046* (2013.01); *B32B 11/10* (2013.01); *B32B 27/32* (2013.01); *B32B 2307/3065* (2013.01); *B32B 2419/06* (2013.01)

(58) Field of Classification Search
CPC ........ B32B 2260/042; B32B 2262/101; B32B 5/26; B32B 2255/02; B32B 2262/0276; B32B 2307/718; B32B 11/02; B32B 15/20; B32B 27/12; B32B 29/02; B32B 2250/04; B32B 2255/26; B32B 2260/046; B32B 2307/732; B32B 11/06; B32B 5/02; B32B 5/024; B32B 25/08
See application file for complete search history.

(56) References Cited

U.S. PATENT DOCUMENTS

| | | |
|---|---|---|
| 2006/0228963 A1* | 10/2006 | Souther ................. B32B 7/12 |
| | | 442/364 |
| 2011/0073239 A1 | 3/2011 | Manning et al. |
| 2011/0018565 A1 | 8/2011 | Klein |
| 2014/0013693 A1 | 1/2014 | Zhou et al. |
| 2017/0267896 A1 | 9/2017 | Zhou et al. |

* cited by examiner

FLAME-RESISTANT COMPOSITES FOR ROOFING UNDERLAYMENT

This application is a National-Stage application of PCT/US2020/040590 filed on Jul. 2, 2020, which claims the benefit of U.S. provisional application No. 62/870,118 filed on Jul. 3, 2019, U.S. provisional application No. 62/872,808 filed on Jul. 11, 2019, and U.S. provisional application No. 62/952,853 filed on Dec. 23, 2019, which are incorporated herein by reference.

FIELD OF THE INVENTION

Embodiments of the present invention are directed toward flame-resistant composites that are useful as roofing underlayment.

BACKGROUND OF THE INVENTION

Roofing underlayments are commonly used in a roof system. As the name implies, underlayment is typically positioned below the external or primary roofing protection, which may include shingles, membranes such as polymeric or asphaltic membranes, roofing tiles, and metal panels or cladding. Often, underlayments provide an extra layer of protection to the roof system. This additional protection may provide, among other benefits, water, moisture, thermal, and/or fire resistance.

Felt paper that is saturated with asphaltic material has historically been used as underlayment to provide additional water and/or moisture resistance to the roof. Other forms of underlayment include synthetic materials such as thermoplastic or thermoset materials formed into sheets. Composites, such as laminates of asphalt and synthetic polymer, have also been employed as underlayment.

In order to meet certain fire resistance properties, which may be required by code or classification, fire or flame resistant underlayment may be employed. These underlayment may include textiles, including woven and non-woven fabrics, made of fire resistant materials such as fiberglass. These fabrics may include a coating, such as a mineral coating, that further enhances the flame or fire resistance of the underlayment.

There is a continued need in the roofing art to provide underlayment with improved resistance to fire and/or flame spread.

SUMMARY OF THE INVENTION

One or more embodiments of the present invention provide a composite comprising (i) a pressure-sensitive adhesive component including first and second planar surfaces; (ii) a fire-resistant fabric adhered to the first planar surface; and (iii) a cap layer disposed on said fire-resistant fabric opposite said asphaltic component.

Yet other embodiments of the present invention provide a composite comprising (i) an asphaltic body having first and second planar surfaces, said body including an asphalt-saturated reinforcing fabric, where the asphaltic-saturated reinforcing fabric is a fire-resistant fabric; and (ii) a cap sheet disposed on the first planar surface of the asphaltic body.

DETAILED DESCRIPTION OF ILLUSTRATIVE EMBODIMENTS

Embodiments of the present invention are based, at least in part, on the discovery of a composite that is useful as roofing underlayment. The composites of the present invention provide advantageous resistance to flame spread. According to aspects of the invention, the composites include a pressure-sensitive adhesive layer (such as an asphaltic layer), a cap layer, and a flame-resistant fabric layer disposed between the pressure-sensitive layer (e.g. asphaltic layer) and the cap layer. In other embodiments, the composite includes a reinforcing fabric that is coated or saturated with a pressure-sensitive adhesive (e.g. an asphalt-saturated reinforcing fabric), where the reinforcing fabric is a flame-resistant fabric. In either embodiment, the composites may include a layer or region of intumescent material (e.g. expandable graphite) in addition to the flame-resistant fabric.

Composite Construction

Figure 1:
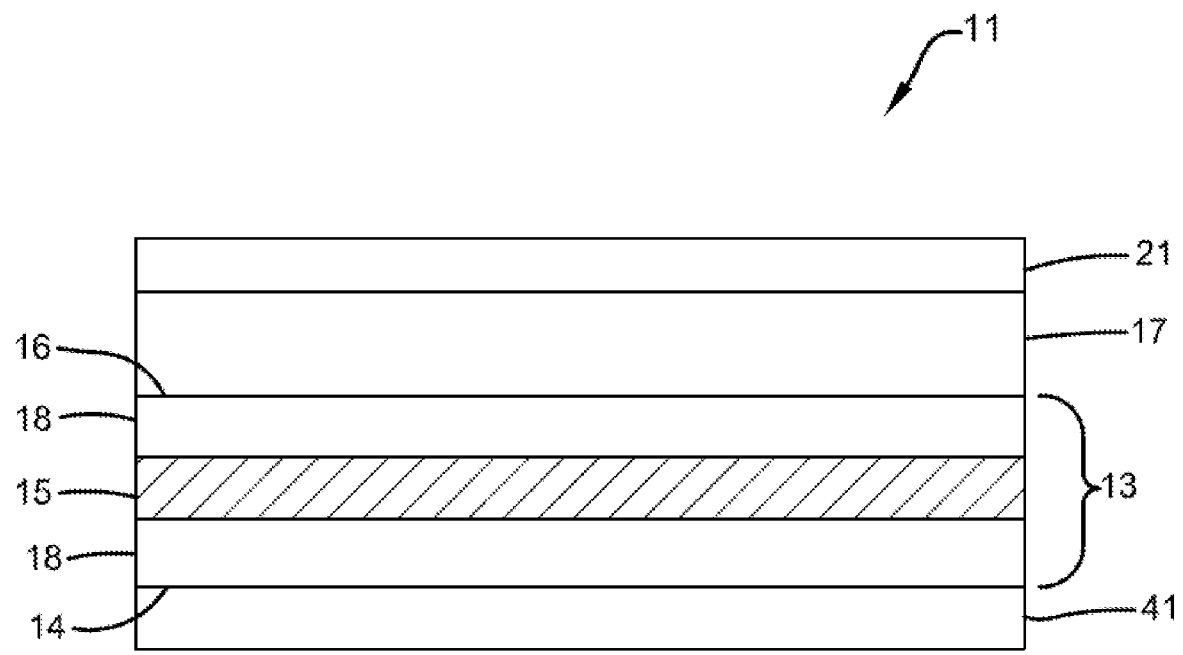
FIG. 1 is a cross-sectional view of a composite according to one or more embodiments of the present invention.

Embodiments of the present invention can be described with reference to FIG. 1, which shows composite 11 including pressure-sensitive adhesive layer 13, flame-resistant fabric layer 17, and cap layer 21. As shown, flame-resistant fabric layer 17 is disposed between pressure-sensitive adhesive layer 13 and cap layer 21. In particular embodiments, pressure-sensitive adhesive layer 13 is an asphaltic layer, which may be referred to as asphaltic layer 13 or asphaltic body 13. As shown in FIG. 1, pressure-sensitive adhesive layer 13 may include an optional fabric 15. For example, asphaltic layer 13 may include a reinforcing fabric 15 that is saturated with asphaltic material 18 (i.e. an asphalt-saturated reinforcing fabric). In one or more embodiments, fabric 15 is a flame-resistant fabric. As also shown in FIG. 1, pressure-sensitive adhesive layer 13 includes a first planar surface 14 and second planer surface 16.

Figure 2:
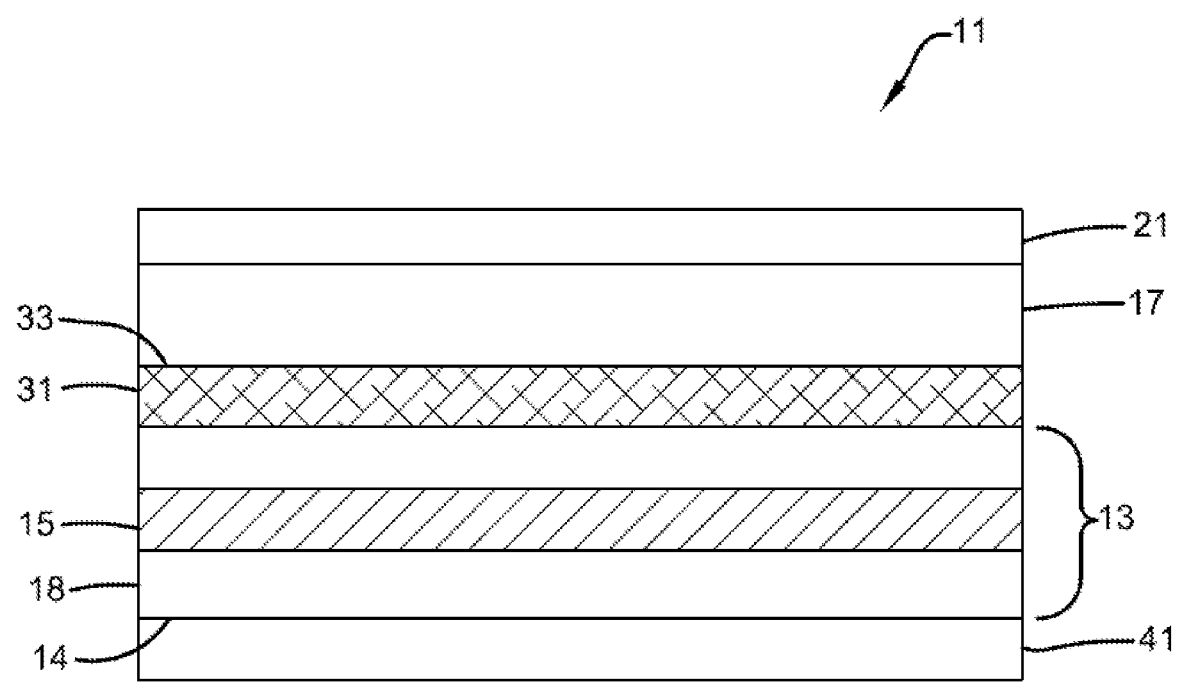
FIG. 2 is a cross-sectional view of a composite according to one or more embodiments of the present invention.

In other embodiments, an example of which is shown in FIG. 2, composite 11 may also include a layer 31 of intumescent material 33, which may be referred to as intumescent layer 31, disposed between flame-resistant fabric layer 17 and pressure-sensitive adhesive layer 13. In one or more embodiments, intumescent layer 31 may be in the form of a concentrated layer or region of intumescent particles that are deposited on pressure-sensitive adhesive layer 13 or flame-resistant fabric 17 prior to mating pressure-sensitive adhesive layer 13 to flame-resistant fabric layer 17.

Figure 3:
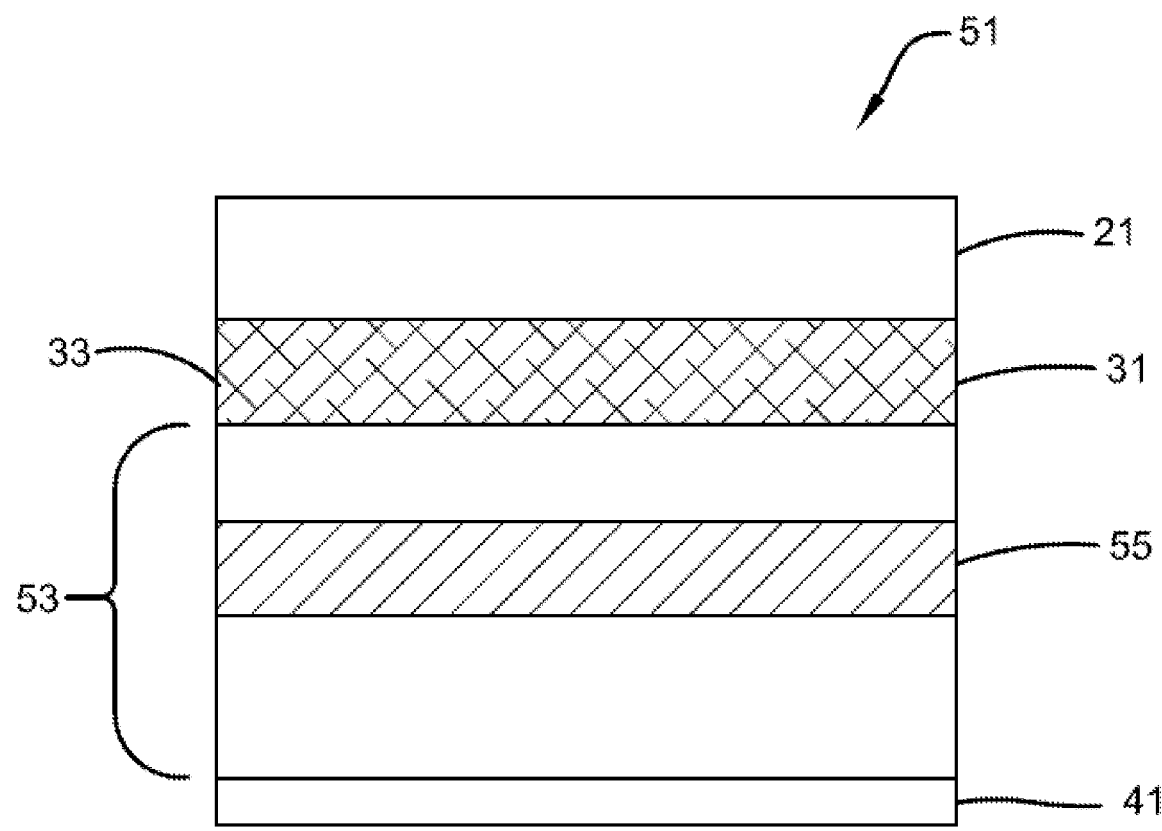
FIG. 3 is a cross-sectional view of a composite according to one or more embodiments of the present invention.

In other embodiments, as shown in FIG. 3, composite 51 includes pressure-sensitive adhesive layer 53, which may be referred to as body 53 (e.g. asphaltic body 53), which includes an asphalt-saturated fabric reinforcing member 55 and cap layer 21 disposed on body 53. Fabric reinforcing member 55 is a flame-resistant fabric. Composite 51 may also include layer 31 of intumescent material 33 disposed between cap layer 21 and body 53. The composites of this embodiment advantageously allow for attachment of cap 21 directly to body 53, optionally with intumescent material 33 sandwiched therebetween, while still providing a fire-resistant fabric 55 within the composite.

Also, as shown in FIGS. 1-4, composite 11 may include a release layer 41 removably attached to pressure-sensitive adhesive layer 13 opposite fabric 17 or cap 21.

Pressure-Sensitive Adhesive

As indicated above, layer 13 includes a layer of pressure-sensitive adhesive. In one or more embodiments, the pressure-sensitive adhesive is an asphaltic material (i.e. a composition including asphaltic constituents). In other embodiments, the pressure-sensitive adhesive is a non-asphaltic pressure-sensitive adhesive.

Asphaltic Pressure-Sensitive Adhesive

In one or more embodiments, layer 13 includes a planar body of asphaltic material, and may therefore be referred to as asphaltic component 13, asphaltic layer 13, or asphaltic body 13. Asphaltic layer 13 may include an optional textile fabric 15 embedded or impregnated within asphaltic material. In certain embodiments, layer 13 is devoid of a scrim or fabric.

In one or more embodiments, the thickness of asphaltic layer 13 may be at least 10, in other embodiments at least 20, and in other embodiments at least 30 mils. In these or other embodiments, the thickness of asphaltic layer 13 may be at most 120, in other embodiments at most 100, in other embodiments at most 90, and in other embodiments at most 80 mils. In one or more embodiments, the thickness of asphaltic layer 13 may be from about 10 to about 100, in other embodiments from about 20 to about 90, and in other embodiments from about 30 to about 80 mils.

In one or more embodiments, the weight of the asphaltic layer 13 may be at least 5, in other embodiments at least 10, and in other embodiments at least 15 pounds per hundred square feet. In these or other embodiments, the weight of the asphaltic layer 13 may be at most 90, in other embodiments at most 70, and in other embodiments at most 50 pounds per hundred square feet. In these or other embodiments, the weight of the asphaltic layer 13 may be from about 5 to about 100, in other embodiments from about 10 to about 80, and in other embodiments from about 15 to about 50 pounds per hundred square feet.

Asphaltic Material

In one or one or more embodiments, the asphaltic material, which may also be referred to as an asphaltic composition or asphaltic-containing composition, includes asphalt binder and optionally, dispersed within the binder, polymeric modifiers, fillers, tackifiers, flame retardants, and other constituents conventionally used in asphaltic-based building materials.

Asphalt Binder

The term "asphalt binder" is used as understood by those skilled in the art and is consistent with the meaning provided by AASHTO M320. As used within this specification, the terms "asphalt" and "asphalt binder" may be used synonymously. The asphalt binder material may be derived from any asphalt source, such as natural asphalt, rock asphalt, produced from tar sands, or petroleum asphalt obtained in the process of refining petroleum. In other embodiments, asphalt binders may include a blend of various asphalts not meeting any specific grade definition. This includes air-blown asphalt, vacuum-distilled asphalt, steam-distilled asphalt, cutback asphalt or roofing asphalt. Alternatively, gilsonite, natural or synthetic, used alone or mixed with petroleum asphalt, may be selected. Synthetic asphalt mixtures suitable for use in the present invention are described, for example, in U.S. Pat. No. 4,437,896. In one or more embodiments, asphalt includes petroleum derived asphalt and asphaltic residual. These compositions may include asphaltenes, resins, cyclics, and saturates. The percentage of these constituents in the overall asphalt binder composition may vary based on the source of the asphalt.

Asphaltenes include black amorphous solids containing, in addition to carbon and hydrogen, some nitrogen, sulfur, and oxygen. Trace elements such as nickel and vanadium may also be present. Asphaltenes are generally considered as highly polar aromatic materials of a number average molecular weight of about 2000 to about 5000 g/mol, and may constitute about 5 to about 25% of the weight of asphalt.

Resins (polar aromatics) include dark-colored, solid and semi-solid, very adhesive fractions of relatively high molecular weight present in the maltenes. They may include the dispersing agents of peptizers for the asphaltenes, and the proportion of resins to asphaltenes governs, to a degree, the sol-or gel-type character of asphalts. Resins separated from bitumens may have a number average molecular weight of about 0.8 to about 2 kg/mol but there is a wide molecular distribution. This component may constitute about 15 to about 25% of the weight of asphalts.

Cyclics (naphthene aromatics) include the compounds of lowest molecular weight in bitumens and represent the major portion of the dispersion medium for the peptized asphaltenes. They may constitute about 45 to about 60% by weight of the total asphalt binder, and may be dark viscous liquids. They may include compounds with aromatic and naphthenic aromatic nuclei with side chain constituents and may have molecular weights of 0.5 to about 9 kg/mol.

Saturates include predominantly the straight-and branched-chain aliphatic hydrocarbons present in bitumens, together with alkyl naphthenes and some alkyl aromatics. The average molecular weight range may be approximately similar to that of the cyclics, and the components may include the waxy and non-waxy saturates. This fraction may from about 5 to about 20% of the weight of asphalts.

In these or other embodiments, asphalt binders may include bitumens that occur in nature or may be obtained in petroleum processing. Asphalts may contain very high molecular weight hydrocarbons called asphaltenes, which may be soluble in carbon disulfide, pyridine, aromatic hydrocarbons, chlorinated hydrocarbons, and THF. Asphalts or bituminous materials may be solids, semi-solids or liquids.

In one or more embodiments, the asphalt binder includes AC-5, AC-10 and AC-15. These asphalts typically contain about 40 to about 52 parts by weight of aromatic hydrocarbons, about 20 to about 44 parts by weight of a polar organic compound, about 10 to about 15 parts by weight of asphaltene, about 6 to about 8 parts by weight of saturates, and about 4 to about 5 parts by weight of sulfur. Nevertheless, practice of the present invention is not limited by selection of any particular asphalt.

In one or more embodiments, the molecular weight of the aromatic hydrocarbons present in asphalt may range between about 300 and 2000, while the polar organic compounds, which generally include hydroxylated, carboxylated and heterocyclic compounds, may have a weight average molecular weight of about 500 to 50,000. Asphaltenes, which are generally known as heavy hydrocarbons, are typically of a high molecular weight and are heptane insoluble. Saturates generally include paraffinic and cycloaliphatic hydrocarbons having about 300 to 2000 molecular weight.

In one or more embodiments, bitumens may be used. Bitumens are naturally occurring solidified hydrocarbons, typically collected as a residue of petroleum distillation. Gilsonite is believed to be the purest naturally formed bitumen, typically having a molecular weight of about 3,000 with about 3 parts by weight complexed nitrogen.

Polymeric Modifiers

In one or more embodiments, the polymeric modifier, which may simply be referred to as polymer, includes thermoplastic polymers, thermosetting elastomers, thermoplastic elastomers, and/or mixtures thereof. Each of these polymers have been used, either alone or in combination with each other to modify asphalt binders, and practice of the present invention is not necessarily limited by the selection of any particular polymeric modifier.

In one or more embodiments, the polymers may be characterized by a glass transition temperature (Tg), as measured by DSC analysis, of less than 150° C., in other embodiment less than 125° C., in other embodiment less than 100° C., in other embodiments less than 20° C., in other embodiments less than 0° C., in other embodiments less than −20° C., in other embodiments less than −35° C., and in other embodiments from about −90° C. to about −20° C. In these or other embodiments, the polymers may be characterized by a glass transition temperature (Tg), as measured by DSC analysis, of more than −20° C., in other embodiments more than 0° C., in other embodiments more than 20° C., in other embodiments more than 50° C., and in other embodiments more than 100° C.

In one or more embodiments, the polymeric modifier may be characterized by a melt index (ASTM D-1238;2.16 kg load @ 190° C.) of less than 1,000 dg/min, in other embodiments less than 500 dg/min, in other embodiments less than 50 dg/min, in other embodiments less than 20 dg/min, in other embodiments less than 10 dg/min, and in other embodiments less than 1 dg/min. In these or other embodiments, the unsaturated polymers may have a melt index of between 3 and 15 dg/min, and other embodiments between 4 and 12 dg/min.

In one or more embodiments, the polymeric modifier may be characterized by a number average molecular weight ($M_n$) of from about 10 to about 1,000 kg/mol, in other embodiments from about 40 to about 500 kg/mol, and in other embodiments from about 80 to about 200 kg/mol. In these or other embodiments, the polymeric modifier may also be characterized by a weight average molecular weight ($M_w$) of from about 10 to about 4,000 kg/mol, in other embodiments from about 40 to about 2,000 kg/mol, and in other embodiments from about 80 to about 800 kg/mol. In one or more embodiments, the polymeric modifier may be characterized by a molecular weight distribution of from about 1.1 to about 5, in other embodiments from about 1.5 to about 4.5, and in other embodiments from about 1.8 to about 4.0. Molecular weight can be determined by gel permeation chromatography (GPC) calibrated with polystyrene standards and adjusted for the Mark-Houwink constants for the polymer in question.

The polymeric modifier may be linear, branched, or coupled polymers. Types of polymers may include both natural and synthetic polymers. Useful synthetic polymers may include polydienes or polydiene copolymers with non-diene comonomer (e.g. styrene). The copolymers may include block and random copolymers. The coupled polymers may include linearly coupled polymers (e.g. di-coupled polymers) or radially coupled polymers (e.g. tri-coupled or, tetra-coupled penta-coupled, hexa-coupled etc.). Exemplary polydienes include polybutadiene and polyisoprene. Exemplary copolymers may include random styrene-butadiene rubber, styrene-butadiene block copolymer, styrene-butadiene-styrene block copolymer, random styrene-isoprene, styrene-isoprene block copolymer, styrene-isoprene-butadiene block copolymer, random styrene-isoprene-butadiene, styrene-isoprene-styrene block copolymer, and chloroprene rubber. In one or more embodiments, the polymeric modifier include linear or radial block copolymers wherein the block copolymers include terminal styrene blocks. In these or other embodiments, the styrene content of these block copolymers may be from 10% to 50% by weight, in other embodiments from 15% to 45% by weight, and in other embodiments from 20% to 40% by weight.

In one or more embodiments, the polymeric modifier is an SBS block copolymer (i.e., poly(styrene-b-butadiene-b-styrene). In one or more embodiments, these block copolymers may be characterized by a weight average molecular weight of from about 90,000 to about 750,000, or in other embodiments from about 150,000 to about 250,000. In these or other embodiments, these polymers may be characterized by a polydispersity of up to about 1.1 or in other embodiments up to about 1.05. In particular embodiments, the SBS block copolymers have from about 27 to about 43 parts by weight of styrene.

An example of an SBS block copolymer useful for practice of the present invention is that sold under the tradename Kraton D (Kraton Polymer Group), including, for example, D1118, D1101, and D1184. Included among these polymers are SBS block linear and radial block copolymers. In particular embodiments, two block copolymers, linear and radial, can be mixed to achieve the desired results. In certain embodiments, the weight ratio of linear to radial SBS copolymers may be from about 0 to about 7 parts by weight of radial and from about 7 to about 15 parts by weight of linear SBS block copolymer.

In one or more embodiments, useful thermoplastic polymers that may be used as the polymeric modifier include polyolefins. For example, several derivatives of polypropylene are useful including those prepared by first dimerizing propylene to give 4-methyl-1-pentene and subsequently polymerizing this dimer to give poly-4-methyl-1-pentene. These polypropylenes may have a weight average molecular weight of from about 50,000 to about 250,000, or in other embodiments from about 150,000 to about 170,000. In one or more embodiments, the polydispersity may be from about 2.5 to about 3.5. The polypropylene may be further characterized by a melt temperature of from about 160° C. to about 175° C., and may have a cold crystallization temperature above 120° C.

In one or more embodiments, the polymeric modifier is isotactic polypropylene (IPP). In one or more embodiments, the IPP has at least 45 percent by weight crystallinity, or in other embodiments from about 46 to about 50 percent by weight crystallinity. Blends of atactic polypropylene and isotactic polypropylene may be used. In yet other embodiments, atactic polyalpha olefins (APAOs) may be used.

Flame Retardants

In one or more embodiments, the flame retardants that may be included in the asphaltic material may include any compound that increases the burn resistivity, particularly flame spread such as tested by UL 94 and/or UL 790. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™.

Examples of other complementary calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

Tackifier Resin

In one or more embodiments, the asphaltic component may include tackifier resins. These resins include, but are not limited to, petroleum resins, synthetic polyterpenes, resin esters and natural terpenes, and combinations thereof. In certain embodiments, the resin modifiers soften or become liquid at temperatures of about 40° C. to about 150° C. In certain embodiments, the resin modifiers have number average molecular weights, as measured by vapor phase osmometry, below that of the polymeric material included in the polymeric film. In certain embodiments, the number average molecular weights of the resin modifiers are less than about 5,000. In other embodiments, the number average molecular weights of the resin modifiers are less than about 1,000. In additional embodiments, the number average molecular weights of the resin modifiers are from about 500 to about 1000.

In certain embodiments, the resin modifiers have ring and ball softening point of about 20° C. to about 160° C. In additional embodiments, resin modifiers have ring and ball softening points of about 40° C. to about 160° C. In still other embodiments, resin modifiers have ring and ball softening points of about 50° C. to about 160° C.

Various types of natural and synthetic resins, alone or in admixture with each other, may be used be selected as the resin modifier. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to, aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. For additional description of resin modifiers, reference can be made to technical literature, e.g., Hydrocarbon Resins, Kirk-Othmer, Encyclopedia of Chemical Technology, 4th Ed. v.13, pp. 717-743 (J. Wiley & Sons, 1995).

In one or more embodiments, the tackifier resins include phenol-based resins. Included among the phenol-based resins are phenolic resins. These resins may include reactive phenol resins (also referred to as functionalized phenol resins), as well as unreactive resins. In one or more embodiments, the phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the phenolic resin may be formed by an acid-catalyzed reaction.

In one or more embodiments, the tackifier resin is a polybutene polymer or oligomer. In particular embodiments, polybutene oils are employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

Other Constituents

In one or more embodiments, the asphaltic component may include oil, which may also be referred to as processing oil or extender oil. These extenders may include high-boiling hydrocarbons. Examples of these oils include paraffinic oils, aromatic oils, naphthenic oils, vegetable oils, and low PCA oils including MES, TDAE, and SRAE, and heavy naphthenic oils, and various synthetic oils such as, but not limited to, polybutene oils. In one or more embodiments, the oil employed is selected based upon its compatibility with the rubber, as well as its ability to provide advantageous properties to the final composition (e.g., green strength or tack). In these or other embodiments, the asphaltic component may also include fillers, extenders, antioxidants, waxes, antiozonants, and the like. Useful fillers include, but are not limited to, inorganic fillers such as calcium carbonate (i.e., limestone) and glass, such as glass beads.

Asphaltic Composition Amounts

In one or more embodiments, the asphaltic material includes at least 0.5, in other embodiments at least 1, in other embodiments at least 3, and in other embodiments at least 5 parts by weight polymeric modifier per 100 parts by weight asphalt binder. In these or other embodiments, the asphaltic material includes at most 40, in other embodiments at most 30, and in other embodiments at most 20 parts by weight polymeric modifier per 100 parts by weight asphalt binder. In one or more embodiments, the asphaltic material includes from about 0.5 to about 40, in other embodiments from about 1 to about 30, and in other embodiments from about 3 to about 20 parts by weight polymeric modifier per 100 parts by weight asphalt binder.

In one or more embodiments, the asphaltic material includes at least 0.5, in other embodiments at least 1, in other embodiments at least 3, and in other embodiments at least 5 parts by weight complementary flame retardant per 100 parts by weight asphalt binder. In these or other embodiments, the asphaltic material includes at most 40, in other embodiments at most 30, and in other embodiments at most 20 parts by weight complementary flame retardant per 100 parts by weight asphalt binder. In one or more embodiments, the asphaltic material includes from about 0.5 to about 40, in other embodiments from about 1 to about 30, and in other embodiments from about 3 to about 20 parts by weight complementary flame retardant per 100 parts by weight asphalt binder.

In one or more embodiments, the asphaltic material includes at least 0.5, in other embodiments at least 1, in other embodiments at least 3, and in other embodiments at least 5 parts by weight tackifier resin per 100 parts by weight asphalt binder. In these or other embodiments, the asphaltic material includes at most 40, in other embodiments at most 30, and in other embodiments at most 20 parts by weight tackifier resin per 100 parts by weight asphalt binder. In one or more embodiments, the asphaltic material includes from about 0.5 to about 40, in other embodiments from about 1 to about 30, and in other embodiments from about 3 to about 20 parts by weight tackifier resin per 100 parts by weight asphalt binder.

In one or more embodiments, the asphaltic material includes at least 0, in other embodiments at least 5, in other embodiments at least 10, and in other embodiments at least 20 parts by weight filler other than flame retardant material per 100 parts by weight asphalt binder. In these or other embodiments, the asphaltic material includes at most 350, in other embodiments at most 100, in other embodiments at least 70, in other embodiments at least 50, and in other embodiments at most 40 parts by weight filler other than flame retardant material per 100 parts by weight asphalt binder. In still other embodiments, the asphaltic material includes from 0 to 350, in other embodiments from 1 to 100, and in other embodiments from 5 to 45 parts by weight filler other than flame retardant material per 100 parts by weight asphalt binder.

Non-Asphaltic Pressure-Sensitive Adhesive

As indicated above, pressure-sensitive layer 13, which may also be referred to as PSA 13, is or includes a planar body of non-asphaltic pressure-sensitive adhesive. As shown in FIG. 1, PSA 13 includes a first planar surface 14 and second planer surface 16. In one or more embodiments, PSA 13 includes non-asphaltic pressure-sensitive adhesive and is devoid of fabric 15.

In one or more embodiments, the thickness of PSA layer 13 may be greater than 90, in other embodiments greater than 100, in other embodiments greater than 120, in other embodiments greater than 140, in other embodiments greater than 150, and in other embodiments greater than 155 μm. In these or other embodiments, the thickness of PSA layer 13 may be less than 500 μm, in other embodiments less than 400 μm, in other embodiments less than 300 μm, and in other embodiments less than 200 μm. In one or more embodiments, the thickness of PSA layer 13 may be from about 90 to about 500 μm, in other embodiments from about 100 to about 400 μm, and in other embodiments from about 120 to about 300 μm.

In one or more embodiments, non-asphaltic pressure-sensitive adhesives that are useful in the practice of this invention include those pressure-sensitive adhesives that are devoid or substantially devoid of asphaltenes or bitumens, where substantially devoid refers to that amount or less that would otherwise have an appreciable impact on the adhesive or the performance of the adhesive. In one or more embodiments, the non-asphaltic pressure-sensitive adhesives include less than 5 wt %, in other embodiments less than 3 wt %, and in other embodiments less than 1 wt % asphaltenes.

In one or more embodiments, practice of the present invention is not limited by the type of non-asphaltic pressure-sensitive adhesive composition employed to form the PSA layer. Included among useful pressure-sensitive adhesives are holt-melt adhesives, which are flowable when heated to threshold temperatures. In one or more embodiments, the adhesive composition may form the entirety of PSA layer 13. In other embodiments, the adhesive composition forms a component of layer 13; for example, the adhesive composition may form a matrix in which other constituents included within the layer are dispersed. These other constituents may include particulate materials such as fillers or non-particulate materials such as, but not limited to, plasticizers, tackifiers, oils, and the like.

In one or more embodiments, the non-asphaltic pressure-sensitive adhesive itself is characterized by a tack, as defined by the Standard Test Method for Tack of Pressure-Sensitive Adhesives by Rolling Ball (ASTM D3121-06), of less than 30 cm, in other embodiments less than 20 cm, and in other embodiments less than 10 cm.

In one or more embodiments, the non-asphaltic pressure-sensitive adhesive itself is characterized by providing a minimum peel strength, as defined by the Standard Test Method for Peel Adhesion of Pressure-Sensitive Label Stocks at 90° Angle (ASTM D6252/D6252M-98(2011)), of at least 0.1 pli, in other embodiments at least 0.3 pli, and in other embodiments at least 0.5 pli.

In one or more embodiments, especially where the pressure-sensitive adhesive is a hot-melt adhesive, the non-asphaltic pressure-sensitive adhesive composition may be characterized as a solid at temperatures below 200° F., in other embodiments below 190° F., in other embodiments below 180° F., and in other embodiments below 170° F. In these or other embodiments, the pressure-sensitive adhesive composition is characterized as a fluid above 200° F., in other embodiments above 250° F., in other embodiments above 300° F., and in other embodiments above 350° F.

Exemplary pressure-sensitive adhesive compositions that may be employed in preparing the PSA layer include those compositions based upon one or more of acrylic polymers, butyl rubber, ethylene vinyl acetate, natural rubber, nitrile rubber, silicone rubber, styrene block copolymers, ethylene-propylene-diene rubber, atactic polyalpha olefins, and vinyl ether polymers. In combination with these base polymers, the pressure-sensitive adhesive compositions may include a variety of complementary constituents such as, but not limited to, tackifying resins, waxes, antioxidants, and plasticizers.

In particular embodiments, the pressure-sensitive adhesive compositions employed in the present invention include polystyrene block copolymers. These block copolymers include at least two types of blocks, which may be referred to as A and B blocks, where the A blocks represent blocks deriving from the polymerization of at least one vinyl aromatic monomer (e.g. styrene) and the B blocks derive from the polymerization of at least one conjugated diene monomer (e.g., butadiene). Exemplary vinyl aromatic monomer includes styrene, p-methylstyrene, α-methylstyrene, and vinylnaphthalene. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

In particular embodiments, the block copolymers include at least two A blocks and at least one B block. For example, the use of A-B-A block copolymers is specifically contemplated. In one or more embodiments, the B block may be hydrogenated. In one or more embodiments, the B block is characterized by at least 75 percent hydrogenation, in other embodiments at least 85 percent hydrogenation, and in other embodiments at least 95 percent hydrogenation, where the percent hydrogenation refers to the number of original double bonds within the block reduced by hydrogenation. For example, a polymer block that is 95 percent hydrogenated includes 5 percent of the original double bonds. In one or more embodiments, the aromatic unsaturation within the A blocks is hydrogenated by less than 25 percent, in other embodiments less than 15 percent, and in other embodiments less than 5 percent.

In one or more embodiments, each A block has a number average molecular weight of at least 2 kg/mole, in other embodiments at least 5 kg/mole, and in other embodiments at least 25 kg/mole. In these or other embodiments, each A block has a number average molecular weight of less than 125 kg/mole, in other embodiments less than 75 kg/mole, and in other embodiments less than 50 kg/mole.

In one or more embodiments, each B block has a number average molecular weight of at least 10 kg/mole, in other embodiments at least 30 kg/mole, and in other embodiments at least 50 kg/mole. In these or other embodiments, each A block has a number average molecular weight of less than 250 kg/mole, in other embodiments less than 175 kg/mole, and in other embodiments less than 125 kg/mole.

Exemplary styrene block copolymers include styrene-butadiene-styrene block copolymer, hydrogenated styrene-butadiene-styrene block copolymer (which may also be referred to as styrene-ethylene/butene-styrene block copolymer), styrene-isoprene-styrene block copolymer, and hydrogenated styrene-isoprene-styrene block copolymer (which may also be referred to as styrene-ethylene/propylene-styrene block copolymer). For ease of description, these polymers may be referred to, respectively, as S-B-S block copolymer, S-E/B-S block copolymer, S-I-S block copolymer, and S-E/P-S block copolymer.

The polystyrene block copolymer-based, pressure-sensitive adhesive compositions used in this invention may also include a modifying resin. In one or more embodiments, modifying resins include end-block modifying resins and/or mid-block modifying resins. As is known in the art, end-block modifying resins include those resins that modify and/or reinforce the styrene blocks of the block copolymer. It is believed that these end-block modifying resins form pseudo cross links between polymer chains. In one or more embodiments, these end-block resins are characterized by a ring and ball softening point of at least 90° C., in other embodiments at least 100° C., in other embodiments at least 110° C., in other embodiments at least 120° C., in other embodiments at least 140° C., and in other embodiments at least 160° C. Exemplary end-block modifying resins include coumarone-indene resins, poly-a-methylstyrene resins, polystyrene resins, vinyl toluene- a-methylstyrene copolymer resins, and polyindene resins. In these or other embodiments, mid-block modifying resins are employed. As is known in the art, mid-block modifying resins include those resins that modify and/or reinforce the diene blocks of the block copolymer. It is believed that these mid-block modifying resins form pseudo cross links between polymer chains. In one or more embodiments, mid-block modifying resins include aliphatic resins such as pentene-type resins, terpene resins, and cycloaliphatic resins.

Exemplary polyphenylene ether resins, such as polyphenylene oxide, may also be used. In one or more embodiments, these resins are characterized by an intrinsic viscosity of less than 0.4 dl/g, in other embodiments less than 0.35 dl/g, and in other embodiments less than 0.2 dl/g, when measured in solution in chloroform at 25° C. Useful polyphenylene ether resins are described in U.S. Pat. Nos. 3,306,874 and 3,257,375, which are incorporated herein by reference.

In one or more embodiments, the pressure-sensitive adhesives based upon styrene block copolymers may also include an adhesive promoting resin or tackifying resin. In one or more embodiments, a hydrogenated tackifying resin is employed. These resins include, but are not limited to, petroleum resins, synthetic polyterpenes, resin esters and natural terpenes, and combinations thereof. In certain embodiments, the resin modifiers soften or become liquid at temperatures of about 40° C. to about 150° C. In certain embodiments, the resin modifiers have number average molecular weights, as measured by vapor phase osmometry, below that of the polymeric material included in the polymeric film. In certain embodiments, the number average molecular weights of the resin modifiers are less than about 5,000. In other embodiments, the number average molecular weights of the resin modifiers are less than about 1,000. In additional embodiments, the number average molecular weights of the resin modifiers are from about 500 to about 1000.

In certain embodiments, the resin modifiers have ring and ball softening point of about 20° C. to about 160° C. In additional embodiments, resin modifiers have ring and ball softening points of about 40° C. to about 160° C. In still other embodiments, resin modifiers have ring and ball softening points of about 50° C. to about 160° C.

Various types of natural and synthetic resins, alone or in admixture with each other, may be used be selected as the resin modifier. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to, aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. For additional description of resin modifiers, reference can be made to technical literature, e.g., Hydrocarbon Resins, Kirk-Othmer, Encyclopedia of Chemical Technology, 4th Ed. v.13, pp. 717-743 (J. Wiley & Sons, 1995).

In one or more embodiments, the tackifier resins include phenol-based resins. Included among the phenol-based resins are phenolic resins. These resins may include reactive phenol resins (also referred to as functionalized phenol resins), as well as unreactive resins. In one or more embodiments, the phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the phenolic resin may be formed by an acid-catalyzed reaction.

In one or more embodiments, the tackifier resin is a polybutene polymer or oligomer. In particular embodiments, polybutene oils are employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

In particular embodiments, the tackifying resins include hydrogenated rosins, esters of rosins, polyterpenes, terpene phenol resins, and polymerized mixed olefins. In one or more embodiments, these resins are liquids at room temperature.

Additionally, the PSA layer may include various other additives such as fillers, extenders, antioxidants, waxes, antiozonants, and the like. Useful fillers include, but are not limited to, inorganic fillers such as calcium carbonate (i.e. limestone) and glass, such as glass beads.

In one or more embodiments, pressure-sensitive adhesive layer includes a cured pressure-sensitive adhesive. In one or more embodiments, the cured pressure-sensitive adhesive layer is formed from a curable hot-melt adhesive. In other words, an uncured adhesive composition is formed (e.g., into a layer) as a hot-melt composition (i.e. the composition is heated and applied as a flowable composition in the absence or appreciable absence of solvent), and then the composition is subsequently crosslinked (i.e. cured) to form the cured pressure-sensitive composition.

In one or more embodiments, the curable adhesive composition may include an acrylic-based hot-melt adhesive. In one or more embodiments, the adhesive includes a polyacrylate such as a polyacrylate elastomer. In one or more embodiments, useful polyacrylates include one or more units defined by the formula:

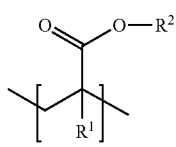

where each $R^1$ is individually hydrogen or a hydrocarbyl group and each $R^2$ is individually a hydrocarbyl group. In the case of a homopolymer, each $R^1$ and $R^2$, respectively, throughout the polymer are same in each unit. In the case of a copolymer, at least two different $R^1$ and/or two different $R^2$ are present in the polymer chain.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each $R^2$ is an alkyl group having at least 4 carbon atoms. In particular embodiments, $R^1$ is hydrogen and $R^2$ is selected from the group consisting of butyl, 2-ethylhexyl, and mixtures thereof.

In one or more embodiments, the polyacrylate elastomers that are useful as adhesives in the practice of this invention may be characterized by a glass transition temperature (Tg) of less than 0° C., in other embodiments less than –20° C., in other embodiments less than –30° C. In these or other embodiments, useful polyacrylates may be characterized by a Tg of from about –70 to about 0° C., in other embodiments from about –50 to about –10° C., and in other embodiments from about –40 to about –20° C.

In one or more embodiments, the polyacrylate elastomers that are useful as adhesives in the practice of this invention may be characterized by a number average molecular weight of from about 100 to about 350 kg/mole, in other embodiments from about 150 to about 270 kg/mole, and in other embodiments from about 180 to about 250 kg/mole.

In one or more embodiments, the polyacrylate elastomers that are useful as adhesives in the practice of this invention may be characterized by a Brookfield viscosity at 150° C. of from about 20,000 to about 70,000 cps, in other embodiments from about 30,000 to about 60,000 cps, and in other embodiments from about 40,000 to about 50,000 cps.

Specific examples of polyacrylate elastomers that are useful as adhesives in the practice of the present invention include poly(butylacrylate), and poly(2-ethylhexylacryalte). These polyacrylate elastomers may be formulated with photoinitiators, solvents, plasticizers, and resins such as natural and hydrocarbon resins.

The skilled person can readily formulate a desirable coating composition. Useful coating compositions are disclosed, for example, in U.S. Pat. Nos. 6,720,399, 6,753,079, 6,831,114, 6,881,442, and 6,887,917, which are incorporated herein by reference.

In other embodiments, the polyacrylate elastomers may include polymerized units that serve as photoinitiators. These units may derive from copolymerizable photoinitiators including acetophenone or benzophenone derivatives. These polyacrylate elastomers and the coating compositions formed therefrom are known as disclosed in U.S. Pat. Nos. 7,304,119 and 7,358,319, which are incorporated herein by reference.

Useful adhesive compositions are commercially available in the art. For example, useful adhesives include those available under the tradename acResin (BASF), those available under the tradename AroCure (Ashland Chemical), and NovaMeltRC (NovaMelt). In one or more embodiments, these hot-melt adhesives may be cured (i.e., crosslinked) by UV light.

In one or more embodiments, the hot-melt adhesive is at least partially cured after being applied to the membrane. In one or more embodiments, the adhesive composition is cured to an extent that it is not thermally processable in the form it was prior to cure. In these or other embodiments, the cured adhesive composition is characterized by including a cross-linked infinite polymer network. While at least partially cured (i.e. the various polymers are chemically cross-linked), the adhesive composition of one or more embodiments is essentially free of curative residue such as sulfur or sulfur crosslinks and/or phenolic compounds or phenolic-residue crosslinks.

In one or more embodiments, the flame retardants that may be included in the PSA layer, which additives include any compound that increases the burn resistivity, particularly flame spread such as tested by UL 94 and/or UL 790. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™.

Examples of other complementary calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

PSA Layer Textile Fabric

As indicated above, pressure-sensitive adhesive layer 13 may optionally include a fabric 15, which may also be referred to as a textile 15, fabric reinforcement 15, reinforcement 15, reinforcing member 15, or textile fabric 15, may include woven and/or non-woven fabrics. Various fabric reinforcements are known in the art, and practice of the present invention is not necessarily limited by the selection of a particular fabric. In one or more embodiments, reinforcement 15 may be fabricated from fiberglass and/or synthetic yards or filaments. Exemplary synthetic yarns include those prepared from polyesters or polyimides.

In one or more embodiments, reinforcing member 15 may be a scrim, or fiberglass mesh sheet, as is known in the art. Useful scrims include those that are commercially available. For example, fiberglass scrims are available under the trade name STYLE™ 930120 (Milliken & Co.; Spartanburg, S.C.) and also available from J. P. Stevens (Greenville, S.C.). In other embodiments, reinforcing sheet may be an organic felt or a combination polyester and glass mat. Useful polyester mats are available from Freudenberg & Co. of Germany.

As indicated above, reinforcing member 15 (and 55 of FIG. 3) may include a flame-resistant fabric as described below with respect to layer 17. In certain embodiments, where fabric 15 or fabric 55 include a flame-resistant fabric as described with respect to layer 17, the flame-resistant fabric may include additional reinforcements. For example, where the flame-resistant fabric is a non-woven fabric, the fabric may include directional (e.g. in the machine direction) reinforcing strands or fibers (e.g. glass strands).

Flame-Resistant Fabric

In one or more embodiments, flame-resistant fabric 17, which may also be referred to as a FR fabric 17, includes a fabric and an intumescent material disposed on or within the fabric. In certain embodiments, the fabric is impregnated with a composition that includes a binder and the intumescent material. In other embodiments, the intumescent material, optionally bound within a binder, is sandwiched between multiple fabrics.

For example, flame-retardant fabric 17 includes a fabric substrate and expandable graphite disposed on a surface of the substrate. In one or more embodiments, the expandable graphite may be dispersed within a polymeric matrix, which may also be referred to as the binder, that is disposed on the fabric substrate. In this regard, reference may be made to an expandable graphite coating disposed on a fabric substrate. Coating may form a layer or partial layer on the fibers or filaments of the substrate. In other embodiments, the coating forms a layer or partial layer over the entire surface of substrate.

In one or more embodiments, the fabric substrate may include a woven, knitted, or non-woven fabric. In particular embodiments, the fabric substrate may be of the type of fabric generally known in the art for preparing roofing membranes. Useful fabric substrates include warp-knit, weft-inserted fabrics, such as those that as are known in the art and, for example, described in U.S. Pat. Nos. 4,491,617, 4,539,254, 4,615,934, and 4,780,350, which are incorporated herein by reference.

In one or more embodiments, the fabric substrate is a synthetic fabric including glass or polymeric fibers or filaments. In particular embodiments, fabric substrate is a fleece, such as a napped fleece. Fleece backings of the type that are useful as fabric backings for roofing membranes are generally known in the art as described in U.S. Pat. Nos. 4,996,812, 5,422,179, 5,981,030, and 6,502,360 which are incorporated herein by reference. In particular embodiments, the fabric substrate is fleece prepared from polyester filaments such as those prepared from polyethylene terephthalate. In one or more embodiments, the fabric substrate is a continuous filament polyester, needle punched, nonwoven fabric. In other embodiments, the fabric backing is a scrim reinforced nonwoven polyester mat. In yet other embodiments, the fabric backing is a glass fiber mat.

In one or more embodiments, where the fabric substrate is a glass fiber mat, the fabric may be characterized by a basis weight of at least 50, in other embodiments at least 60, and in other embodiments at least 70 $g/m^2$. In these or other embodiments, the glass fiber mat may be characterized by a basis weight of at most 150, in other embodiments at most 130, and in other embodiments at most 100 $g/m^2$. In one or more embodiments, the glass fiber mat may be characterized by a basis weight of from about 50 to about 150 $g/m^2$, in other embodiments from about 60 to about 130 $g/m^2$, and in other embodiments from about 70 to about 110 $g/m^2$.

In one or more embodiments, where the fabric substrate is a glass fiber mat, the glass mat may be characterized by a thickness of at least 0.5 mm, in other embodiments at least 0.7 mm, and in other embodiments at least 1.0 mm. In these or other embodiments, the glass mat may be characterized by a thickness of at most 2.0 mm, in other embodiments at most 1.5 mm, and in other embodiments at most 1.2 mm. In one or more embodiments, the glass mat may be characterized by a thickness of from about 0.5 to about 2.0 mm, in other embodiments from about 0.7 to about 1.5 mm, and in other embodiments from about 1.0 to about 1.2 mm.

In one or more embodiments, where the fabric substrate is a polyester fleece, the fabric may be characterized by a basis weight of at least 70, in other embodiments at least 85, and in other embodiments at least 100 g/m². In these or other embodiments, the polyester fleece may be characterized by a basis weight of at most 400, in other embodiments at most 300, and in other embodiments at most 280 g/m². In one or more embodiments, the polyester fleece may be characterized by a basis weight of from about 70 to about 400 g/m², in other embodiments from about 85 to about 300 g/m², and in other embodiments from about 100 to about 280 g/m².

In one or more embodiments, where the fabric substrate is a polyester fleece, the glass mat may be characterized by a thickness of at least 0.5 mm, in other embodiments at least 0.7 mm, and in other embodiments at least 1.0 mm. In these or other embodiments, the polyester fleece may be characterized by a thickness of at most 4.0 mm, in other embodiments at most 2.0 mm, and in other embodiments at most 1.5 mm. In one or more embodiments, the polyester fleece may be characterized by a thickness of from about 0.5 to about 4.0 mm, in other embodiments from about 0.7 to about 2.0 mm, and in other embodiments from about 1.0 to about 1.5 mm.

In one or more embodiments, the binder, which may also be referred to as a polymer latex or polymer latex binder, may include, but is not limited to, styrene-butadiene-rubber (SBR), styrene-butadiene-styrene (SBS), ethylene-vinyl-chloride (EVC1), poly-vinylidene-chloride (PVdC), modified poly-vinyl-chloride (PVC), poly-vinyl-alcohol (PVOH), ethylene-vinyl-acetate (EVA), and poly-vinyl-acetate (PVA). In one or more embodiments, the binder may include an asphalt. In other embodiments, the binder is devoid of asphalt. In still other embodiments, the binder may include acrylic or epoxy binders or resins, which are known in the art. Generally, acrylic binders or resins include latex polymers that derive from the polymerization of acrylates, acrylic acids, methacrylates, methacrylic acids, acrylonitrile, and/or acrylamide monomer. In other embodiments, the binder may include a polyurethane. Examples of inorganic binders that may be used with the latex binders include, but are not limited to, calcium oxide, calcium silicate, calcium sulfate, magnesium oxychloride, magnesium oxysulfate, and other complexes of some Group IIA elements (alkaline earth metals), as well as aluminum hydroxide. In one or more embodiments, a complex inorganic binder such as portland cement, which is a mixture of various calcium-aluminum silicates, may be used. In other embodiments, the oxychloride or oxysulfate of aluminum hydroxide and/or calcium silicate may also be used. In yet other embodiments, quicklime, which does not hydrate in a coating mix, but cures by slowly converting to limestone by adding carbon dioxide from the air, may be used. acrylonitrile, and/or acrylamide monomer. In other embodiments, the binder may include a polyurethane.

In one or embodiments, the coating composition may be characterized by the weight ratio of polymer to solids within the composition (i.e. in the cured coating). In one or more embodiments, the weight ratio of polymer to solids is at least 0.1:1, in other embodiments at least 0.3:1, in other embodiments at least 0.5:1, in other embodiments at least 0.7:1, and in other embodiments at least 0.7:1. In these or other embodiments, the weight ratio of polymer to solids is from about 0.1:1 to about 3:1, in other embodiments from about 0.3:1 to about 2:1, and in other embodiments from about 0.4:1 to about 0.8:1. It is contemplated that at higher polymer loadings, the coating composition will impart less stiffness to the fabric, and thereby advantageously allow the fabric to maintain useful flexibility. This is important, especially where the fabric is used as a backing, because the composite materials of the invention are desirably rolled for storage and shipment, unrolled during installation, and manipulated in corners and the like during installation. Thus, maintaining flexibility and/or not inhibiting the flexibility of the membrane and overall composite is technologically important.

In one or embodiments, the coating composition may be characterized by the weight of expandable graphite within the composition (i.e. in the cured coating). In one or more embodiments, the weight of expandable graphite within the coating is at least 2 wt %, in other embodiments at least 5 wt %, in other embodiments at least 8 wt %, in other embodiments at least 10 wt %, and in other embodiments at least 15 wt %. In these or other embodiments, the weight ratio of polymer to solids is from about 2 to about 50, in other embodiments from about 5 to about 35, and in other embodiments from about 10 to about 25 wt %.

In particular embodiments, flame-resistant fabric 17 is a non-woven fabric having expandable graphite, and optionally one or more additional flame resistant or flame retardant materials, dispersed within the non-woven network. In one or more embodiments, the non-woven network may be formed from glass strands or chopped glass fibers, or in other embodiments may include a mixture of glass and organic (e.g. polymeric) fibers, strands, and/or chopped fibers. These non-woven fabrics can be produced by employing conventional techniques for preparing non-woven fabric by placing the expandable graphite, and optionally binder, into the slurry or other mixture for forming the non-woven fabric. These techniques can alleviate the need to subsequently coat or otherwise impregnate an existing fabric with a composition that includes the expandable graphite.

Fire-resistant fabrics of the type that are useful in the practice of this invention are generally known. For example, useful fire-retardant fabrics are described in U.S. Pat. Nos. 5,340,643, 5,384,188, and 6,274,647, as well as U.S. Publ. Nos. 2102/0315458 and 2017/0067257, all of which are incorporated herein by reference.

Fire-resistant fabrics of the type that are useful in the practice of this invention are also commercially available. For example, useful fabrics are available under the tradename Tecnofire T6594-03 (Technical Fibre Products).

Optional Layer of Intumescent Material

Figure 4:
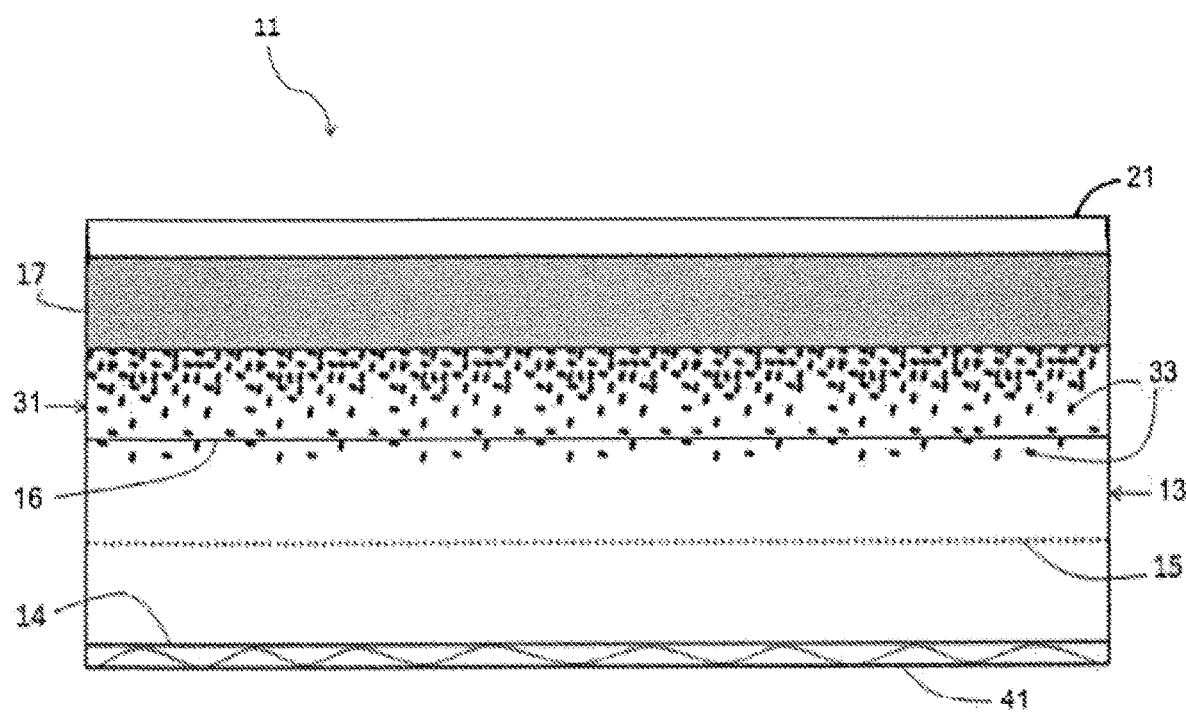
FIG. 4 is a cross-sectional view of a composite according to one or more embodiments of the present invention.

As suggested above, and as shown in FIGS. 2-4, the composites of the invention (e.g. composite 11) may include a layer 31 of intumescent material 33. In one or more embodiments, layer 31 includes one or more layers of particles of expandable graphite 33. These particles may be held in place by a matrix of the pressure-sensitive adhesive (e.g. asphalt material) present within at least a portion of component 13. In these or other embodiments, the expandable graphite 33 is held in place by being adhered to the surface 16 of pressure-sensitive adhesive layer 13 (e.g. on surface 16 of asphaltic component 13). In one or more embodiments, asphaltic component 13 may also include expandable graphite dispersed therein. In other words, the composite may include expandable graphite dispersed throughout layer 13 and layer 31 of expandable graphite sandwiched between PSA layer 13 and FR fabric 17. Composites including a layer of intumescent material are known as described in U.S. Publ. Nos. 2014/0013693, 2016/0347033, and 2018/0326702, which are incorporated herein by reference.

In one or more embodiments, layer 31 may include a planar region within composite 11 that includes a higher concentration of expandable graphite relative to any other region of composite 11. Thus, layer 31 may include a continuous layer of expandable graphite having a variable or relatively constant thickness across composite 11. Or, in other embodiments, the expandable graphite may be discontinuous throughout the region so long as the concentration of expandable graphite within the region is higher than in other areas or regions of composite 11. In one or more embodiments, the discontinuity of the expandable graphite within the layer 31 may result from the pressure-sensitive adhesive material (e.g. asphaltic material) which may form a matrix in which the expandable graphite is at least partially dispersed within this region or layer. It should also be appreciated that the concentration of the expandable graphite may not be constant within this layer. Indeed, as will be appreciated from the description of how to fabricate the sheets of this embodiment, a concentration gradient may exist whereby the concentration of the expandable graphite moves from a region of maximum concentration to a region of decreased concentration. As shown in expanded view in FIG. 3, the concentration of expandable graphite 33 furthest from planar surface 16 within layer 31 is the highest, which corresponds to a minimum in pressure-sensitive adhesive concentration. On the other hand, the concentration of expandable graphite 33 proximate to planar surface 16 is a minimum relative to the concentration of expandable graphite within layer 31.

While a continuous layer or region (e.g. region 31) is believed to be advantageous, it is also contemplated that the sheet can include multiple discreet regions of the expandable graphite, such as may exist in a pattern where the expandable graphite is applied on the top of the pressure-sensitive adhesive layer in rows or strips in the machine direction of the sheet. This may be advantageous where greater adhesion to a top sheet (e.g. composite 17) is desired.

In one or more embodiments, the thickness of layer 31 may be at least 10 μm, in other embodiments at least 20 μm, in other embodiments at least 30 μm, in other embodiments at least 75 μm, and in other embodiments at least 100 μm. In these or other embodiments, the thickness of layer 31 may be at most 3 mm, in other embodiments at most 2 mm, and in other embodiments at most 1 mm. In one or more embodiments, the thickness of layer 31 may be from about 10 μm to about 3 mm, in other embodiments from about 75 μm to about 2 mm, and in other embodiments from about 100 μm to about 1 mm.

Expandable Graphite

As indicated above, useful intumescent material includes expandable graphite. Expandable graphite may also be referred to as expandable flake graphite, intumescent flake graphite, or expandable flake; and, for the purposes herein, these terms may be used interchangeably.

In one or more embodiments, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments, the expandable graphite may be characterized as having a median size in the range from about 30 μm to about 1.5 mm, in other embodiments from about 50 μm to about 1.0 mm, and in other embodiments from about 180 to about 850 μm. In certain embodiments, the expandable graphite may be characterized as having a median size of at least 30 μm, in other embodiments at least 44 μm, in other embodiments at least 180 μm, and in other embodiments at least 300 μm. In one or more embodiments, expandable graphite may be characterized as having a median size of at most 1.5 mm, in other embodiments at most 1.0 mm, in other embodiments at most 850 μm, in other embodiments at most 600 μm, in yet other embodiments at most 500 μm, and in still other embodiments at most 400 μm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 80% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the pressure-sensitive adhesive component is partially expanded. In one or more embodiments, the expandable graphite is not expanded, however, to a deleterious degree, which includes that amount or more of expansion that will deleteriously the ability to form the sheet product and the ability of the graphite to serve as flame retardant at desirable levels, which include those levels that allow proper formation of the sheet. In one or more embodiments, the expandable graphite is expanded to at most 60%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature and also alternatively referred to as the temperature at which expansion of the graphite starts.

Cap Layer

As indicated above, composite 11 may include cap layer 21. As the skilled person will appreciate, cap layer 21 servers to protect the underlying layers and allows for or facilitates foot traffic once installed on a roof surface. In one or more embodiments, cap layer 21 is a thermoplastic layer and, in certain embodiments, includes a polyolefinic thermoplastic resin. Useful thermoplastic resin that can be formed into cap layer 21 include propylene-based polyolefins such as, but not limited to, polypropylene, propylene-ethylene copolymers, propylene-alpha-olefin copolymers. In particular embodiments, the cap layer may be foamed or otherwise textured to facilitate foot traffic. Also, cap layer 21 can be modified with or include multiple layers that include different polymer or additives with the end goal of providing for or facilitating foot traffic. In yet other embodiments, cap layer 21 may include a glass scrim, polyester mat, metal foil (e.g. aluminum foil), fabric, elastomeric layer, and the like.

Release Layer

As discussed above, composite 11 may include release layer 41 removably secured to first layer 14 of pressure-sensitive adhesive layer 13 (e.g. asphaltic component 13). In or more embodiments, release layer 41, which may also be referred to as release liner, includes a thin film that may form a temporary bond with that the surface 14 of component 13, but which bond can be readily broken by applying minimal tension. In one or more embodiments, the release liner may include a paper or cellulosic structure coated with a polymeric coating. In other embodiments, the release liner may include a homogeneous polymeric structure; for example, the release liner may include a polyester or polyolefin (e.g. polypropylene) film. Release liner may advantageously provide protection to component 13 during storage or shipment.

Method of Making Composite

Asphaltic Pressure-Sensitive Layer

In one or more embodiments, the composites of the present invention that include an asphaltic pressure-sensitive adhesive layer may be prepared by first forming the asphaltic component, optionally applying a layer of intumescent material to the asphaltic component, mating a flame-retardant fabric to the asphaltic component, mating a polymeric film to the flame-retardant fabric, and optionally applying a release film to the asphaltic component opposite the flame-retardant fabric. The skilled person will appreciate certain variations to this methodology. For example, in one or more embodiments, a polymer film can be applied to the flame-retardant fabric prior to mating the fabric-plastic composite to the asphaltic component. Also, the release film can be applied to the asphaltic component prior to mating the flame-retardant fabric to the asphaltic component.

In one or more embodiments, the asphaltic component can be prepared by using conventional techniques for forming asphaltic sheet. For example, the technique may include, in certain embodiments, saturating a reinforcing textile with a molten asphalt composition. The step of saturating the sheet may include submerging the reinforcing sheet into a bath of molten asphalt. In other embodiments, the step of saturating the sheet may include spraying, roll coating, or otherwise applying a molten asphalt composition to a reinforcing sheet. Where a reinforcing sheet is not employed, a molten asphalt material can be applied to release paper or film and then processed into a sheet that is devoid of reinforcing scrim.

In certain embodiments, the molten asphalt composition (i.e. molten asphaltic material) can be prepared by introducing one or more of the various additives to a molten asphalt composition. In one or more embodiments, the temperature of the molten asphalt composition at the time of introduction of the additives is at least 125° C., in other embodiments at least 140° C., in other embodiments at least 150° C., in other embodiments at least 160° C., and in other embodiments at least 170° C. In one or more embodiments, these temperatures are maintained during mixing and processing.

In an exemplary process, a reinforcing member, which can be referred to as a sheet, is provided. This sheet may be in the form of a planar sheet and may be provided in the form of a roll. In particular embodiments, this sheet is a FR fabric, which is described herein. In one or more embodiments, the asphalt coater may be a reservoir of hot liquid asphalt. In other embodiments, the asphalt coater may include spraying apparatus to coat the reinforcing sheet with liquid asphalt. In yet other embodiments, reinforcing sheet may be coated with hot liquid asphalt by any alternative methods known to persons having ordinary skill in the art.

In one or more embodiments, the reinforcing sheet is drawn through an asphalt coater, which applies hot liquid (i.e. molten asphalt) to the reinforcing sheet to create a sheet that is saturated with asphalt. As noted above, the asphalt composition may include polymeric modifiers, fillers, and other ingredients conventionally employed with asphalt compositions.

Following formation of the asphaltic component, intumescent particles (e.g. expandable graphite particles) can be dropped on to the asphaltic component (e.g. a newly formed asphaltic sheet). These particles are dropped at a rate and amount to create at least a partial layer of expandable graphite particles adjacent to the asphalt of the coated asphalt sheet. In one or more embodiments, the act of dropping the expandable graphite particles on to a coated sheet may at least partially embed some of the graphite particles in to the asphalt such that the asphalt serves as a binder to hold the graphite particles in place. In these or other embodiments, one or more of the plurality of expandable graphite particles are adhered to the surface of the coated asphalt sheet by way of the adhesive properties of the asphalt material. In one or more embodiments, the step of dropping the expandable graphite creates a concentration gradient of the expandable graphite and the asphalt.

In one or more embodiments, the process of dropping expandable graphite particles on to an asphaltic sheet takes place after the asphaltic sheet is prepared from a molten asphalt composition and prior to a substantial cooling of the asphalt material so as to take advantage of the adhesive properties of the asphalt. In one or more embodiments, at least a portion of the expandable graphite particles are dropped on or otherwise applied to the coated asphalt sheet within 15 seconds, in other embodiments within 10 seconds, and in other embodiments within 5 seconds of the asphaltic sheet being prepared (e.g. removal of the asphaltic sheet from a molten bath in which the asphaltic sheet is prepared). In one or more embodiments, the expandable graphite is dropped on the asphaltic sheet prior to solidification of the asphalt material (e.g. prior to the asphaltic sheet cooling to a temperature below about 85° C.

In one or more embodiments, the expandable graphite particles are applied to the surface of an asphaltic sheet using a multi-stage process. For example, a multi-stage process may include multiple drops of graphite particles. In certain embodiments, the various stages or drops can be configured to achieve certain characteristics. For example, different sized expandable graphite particles can be dropped at different stages in order to achieve desirable coverage of the surface of the asphaltic sheet.

In one or more embodiments, additional asphaltic material may be applied to the sheet after application of the expandable graphite (e.g. after dropping the expandable graphite onto the sheet, which can form the layer of expandable graphite or concentrated region of expandable graphite). This may take place by using curtain coating or roll coating techniques. In other embodiments, the expandable graphite is dropped onto the hot asphaltic sheet prior to the sheet being calendered or sized within a nip roll. As a result, then the sheet is calendered or sized within a nip roll, the excess asphaltic material at the nip roll will serve to form a layer (or skin) of asphaltic material over the layer of expandable graphite.

Non-Asphaltic Pressure-Sensitive Layer

In those embodiments where the pressure-sensitive layer is a non-asphaltic pressure-sensitive adhesive, the composites of the present invention may also be prepared by employing several techniques. In certain embodiments, a PSA transfer film is provided, and this transfer film is laminated to a first planar surface of the FR fabric. A film for forming the cap layer is laminated to the second planar surface of the FR fabric. These laminations may take place sequentially (in either order) or they may take place simultaneously. In one or more embodiments where the PSA is cured (i.e. crosslinked), the PSA layer may be subjecting to curing conditions prior to laminating the PSA to the cap layer or prior to laminating the PSA to the FR fabric. These crosslinking conditions may include, but are not limited to, subjecting the PSA to UV light to effect a UV cure of the PSA. In this respect, U.S. Publ. Nos. 2016/0230392, 2017/0015083, 2017/0114543, and 2018/0257310 are incorporated herein by reference.

In other embodiments, the PSA is deposited directly onto a first planar surface of the FR fabric by employing extrusion or coating techniques. The coating can optionally be cured after being deposited on the FR fabric. The release layer may optionally be applied to the PSA after it is deposited on the FR fabric.

In these or other embodiments, the cap layer may be formed by extruding a thermoplastic material directly to the second planar surface of the FR fabric. Alternatively, a plastic film can be laminated to the FR fabric before or after the pressure-sensitive adhesive is secured to the FR fabric.

The skilled person will appreciate certain variations to these methodologies can be used to form the composite. For example, in one or more embodiments, a polymer film can be applied to the flame-retardant fabric through lamination, which forms the cap sheet, and then (or prior to) a holt-melt adhesive can be applied to the opposite surface of the fabric to form the PSA layer. A release film is then applied to the PSA layer.

In one or more embodiments, a transfer film of the PSA is formed. According to these embodiments, the PSA is deposited on a release film, which release film ultimately forms the release layer of the composite. In particular embodiments, the PSA is deposited onto the release film as a hot-melt adhesive. In other embodiments, the PSA is coated on to the release layer as a solvent-borne composition that is subsequently cured (i.e., the solvent is evaporated) to provide a solid PSA layer.

Following formation of the PSA transfer film or direct application of the PSA to the FR fabric, intumescent particles (e.g., expandable graphite particles) may be dropped on to a surface of the PSA layer opposite the release film or the fabric. These particles are dropped at a rate and amount to create at least a partial layer of expandable graphite particles in or on the PSA layer. In one or more embodiments, the act of dropping the expandable graphite particles on to PSA layer may at least partially embed some of the graphite particles in to the PSA such that the PSA serves as a binder to hold the graphite particles in place. In these or other embodiments, one or more of the plurality of expandable graphite particles are adhered to the surface of the PSA layer by way of the adhesive properties of the PSA. In one or more embodiments, the step of dropping the expandable graphite creates a concentration gradient of the expandable graphite within a portion of the PSA layer.

In those embodiments that employ a transfer film, after formation of the film, the flame-resistant fabric is then laminated to the pressure-sensitive adhesive layer. Where a layer of intumescent material (e.g. particles of expandable graphite) are applied to a surface of the PSA, the flame-resistant fabric is laminated to the surface carrying the intumescent material. Lamination may take place by virtue of the pressure-sensitive adhesive layer. In one or more embodiments, the surface of the pressure-sensitive adhesive layer is heated prior to the lamination step.

In one or more embodiments, the expandable graphite particles are applied to the surface of PSA layer using a multi-stage process. For example, a multi-stage process may include multiple drops of graphite particles. In certain embodiments, the various stages or drops can be configured to achieve certain characteristics. For example, different sized expandable graphite particles can be dropped at different stages in order to achieve desirable coverage of the surface of the PSA layer.

In one or more embodiments, additional PSA material is applied after application of the expandable graphite (e.g., after dropping the expandable graphite, which can form the layer of expandable graphite or concentrated region of expandable graphite). This may take place by using curtain coating or roll coating techniques.

Mating of Flame-Retardant Fabric

In one or more embodiments, the FR fabric can be formed by applying a coating composition (i.e. the expandable graphite and the binder) to one surface of a fabric opposite the surface that the fabric is secured to the asphaltic component. This can be achieved through an application method whereby the coating composition is applied to only one planar surface of the fabric. As a result, the amount of coating material that exists on a first side of the fabric is substantially greater than the amount of coating that exists on the opposite second side of the fabric. It is contemplated that this configuration will allow for maximum adhesion of the fabric to the asphaltic component.

Upon formation of the asphaltic component, the intumescent material (e.g. expandable graphite) is then optionally applied to a surface of the asphaltic component as described herein. This advantageously takes place while the asphaltic component is in a molten or semi-molten state, which improves adhesion of the intumescent particles to the asphaltic component and optionally at least partially embeds at least some of the particles into the asphaltic component. As described above, the process of dropping intumescent materials onto a molten or semi-molten asphaltic component may result in the formation of a layer of intumescent material having a concentration gradient.

The flame-resistant fabric is then laminated to the asphaltic component. Where a layer of intumescent material (e.g. particles of expandable graphite) are applied to a surface of the FR fabric, the surface of the flame-resistant fabric carrying the coating can be laminated to the surface of the pressure-sensitive layer carrying the intumescent material. In other embodiments, the FR fabric is laminated to the PSA by mating the surface of the FR fabric opposite the intumescent coating to the PSA layer. Lamination may take place by virtue of the asphaltic component being in a molten or semi-molten state, or simply by virtue of the asphaltic component being a temperature where the surface of the asphaltic component has sufficient tack to accomplish lamination. In one or more embodiments, the surface of the asphaltic component is heated prior to the lamination step.

In one or more embodiments, the flame-resistant fabric is pre-laminate to a plastic sheet or film (e.g. the cap layer) prior to laminating the fabric to the PSA component (e.g. asphaltic component). This composite, which may also be referred to as a pre-laminate, can be formed by using several techniques. For example, an adhesive layer can be used to laminate the plastic film to the fabric. This adhesive layer may include a hot-melt pressure sensitive adhesive or it may include a liquid adhesive that may be a least partially dried prior to the step of laminating the plastic sheet. In other embodiments, a plastic film may be extruded directly onto the fabric. In other embodiments, the plastic sheet, upon heating, has sufficient tack to allow for the direct lamination of the plastic to the fabric.

In other embodiments, a two-step lamination process takes place. For example, the flame-resistant fabric can first be laminated to the PSA component, and then following this lamination step, the plastic file (i.e. cap layer) is laminated to the fabric.

Mating of Polymeric Layer

In certain embodiments, a polymeric layer is applied to the asphaltic sheet after application of the expandable graphite particles. For example, following one or more drops or applications of the expandable graphite particles to a surface of the asphaltic sheet, a polymeric film may be applied over the expandable graphite particles. In one or more embodiments, this may facilitate subsequent calendaring of the asphaltic sheet carrying the expandable graphite particles. In other embodiments, the layer of expandable graphite particles may be modified by the application of a release agent, such as sand, silica, or talc, over the expandable graphite particles. The presence of release agents may, like the polymeric film, facilitate subsequent calendaring of the asphaltic sheet.

In one or more embodiments, the asphaltic sheet may be drawn through a cooling station to cool the hot asphalt and create a more stable substrate for the application of granules. In one or more embodiments, the cooling station may include a water reservoir through which the asphaltic sheet is drawn. In certain embodiments, the asphaltic sheet may float across a water reservoir to cool the sheet while allowing the top surface to retain a higher temperature than the bottom surface. In other embodiments, the cooling station may include other cooling mechanisms known to those skilled in the art.

INDUSTRIAL APPLICABILITY

In one or more embodiments, the composite of the present invention may be used as an underlayment. For example, the composite may be employed as an underlayment within a metal roofing system. In one or more embodiments, the metal roofing system may include a roof deck, an optional insulation layer, the underlayment of the present invention, and metal panels, which may also be referred to as metal cladding. In other embodiments, the asphaltic sheet of the present invention may be employed as an underlayment within a tile roofing system. In one or more embodiments, the tile roofing system may include a roof deck, an optional insulation layer, the underlayment of the present invention, and roofing tiles. In yet other embodiments, the composite of the present invention may be used as an underlayment for shingles. In these or other embodiments, the composite may be used as an underlayment for a roof that includes solar cells or other power generating systems. Roof systems that incorporate underlayments or other barrier sheets are generally known as described in U.S. Publ. Nos. 2014/0013693, 2016/0347033, and 2018/0326702, which are incorporated herein by reference.

Composites of the present invention may advantageously be installed by employing peel and stick techniques. For example, a composite, which may be in the form of a roll, may be transported and delivered to a roof site. The composite can be unrolled, the release liner removed, and then the composite can be installed by contacting the PSA layer exposed by removal of the release liner to the roof substrate. Adjacent composites can likewise be installed, optionally overlapping one another, to thereby cover the roof surface. Other elements of the roof system, such as a metal roof or solar panels, can then be installed over the composite layer.

Various modifications and alterations that do not depart from the scope and spirit of this invention will become apparent to those skilled in the art. This invention is not to be duly limited to the illustrative embodiments set forth herein.

What is claimed is:

1. A composite comprising:
 (i) an asphaltic body including first and second planar surfaces, said body including an asphalt-saturated reinforcing fabric;
 (ii) a non-woven glass fabric impregnated with an intumescent material adhered to the first planar surface; and
 (iii) a cap layer disposed on said non-woven glass fabric opposite said asphaltic body.

2. The composite of claim 1, further comprising a release layer removably adhered to the second planar surface of the asphaltic body.

3. The composite of claim 1, further comprising expandable graphite disposed between said asphaltic body and said non-woven glass fabric.

4. The composite of claim 1, where the cap layer is a polyolefin sheet.

5. The composite of claim 1, where the non-woven glass fabric includes a fabric substrate having intumescent material disposed thereon.

6. The composite of claim 5, where the intumescent material disposed on said fabric substrate is expandable graphite.

7. The composite of claim 5, where said intumescent material is adhered to said fabric substrate through a binder.

8. The composite of claim 1, where the non-woven glass fabric includes fibers and an intumescent material dispersed within a binder.

9. The composite of claim 8, where the intumescent material of said non-woven fabric includes expandable graphite.

10. The composite of claim 1, where the asphalt-saturated reinforcing fabric is a fire resistant fabric.

11. The composite of claim 1, where the asphalt-saturated reinforcing fabric is a woven fabric.

12. The composite of claim 1, where the asphalt-saturated reinforcing fabric further includes an intumescent material disposed on said reinforcing fabric.

13. The composite of claim 12, where the intumescent material disposed on said reinforcing fabric is expandable graphite.

14. The composite of claim 12, where said intumescent material is adhered to said reinforcing fabric through a binder.

15. A roof system including the composite of claim 1.

* * * * *